(12) United States Patent
Tuikin

(10) Patent No.: US 9,457,643 B1
(45) Date of Patent: Oct. 4, 2016

(54) AUTO SUN GLARE ELIMINATOR SYSTEMS

(71) Applicant: Aliaksandr Tuikin, Bensalem, PA (US)

(72) Inventor: Aliaksandr Tuikin, Bensalem, PA (US)

( * ) Notice: Subject to any disclaimer, the term of this patent is extended or adjusted under 35 U.S.C. 154(b) by 0 days.

(21) Appl. No.: 14/674,445

(22) Filed: Mar. 31, 2015

Related U.S. Application Data

(60) Provisional application No. 61/974,445, filed on Apr. 3, 2014.

(51) Int. Cl.
*B60J 3/02* (2006.01)

(52) U.S. Cl.
CPC ............ *B60J 3/0234* (2013.01); *B60J 3/0204* (2013.01)

(58) Field of Classification Search
CPC .... B60J 3/0213; B60J 3/0234; B60J 3/0247; B60J 3/0256; B60J 3/04
USPC ..................................... 296/97.4, 97.7, 97.11
See application file for complete search history.

(56) References Cited

U.S. PATENT DOCUMENTS

| | | | | |
|---|---|---|---|---|
| 1,829,924 A * | 11/1931 | Evertts | .................. | B60J 3/02 248/205.5 |
| 2,706,659 A * | 4/1955 | Landis | .................. | B60J 3/02 188/67 |
| 3,372,953 A * | 3/1968 | Weaver | .................. | B60J 3/02 296/97.11 |
| 3,834,755 A * | 9/1974 | Dexter | .................. | B60J 3/0213 296/97.11 |
| 3,865,428 A * | 2/1975 | Chester | .................. | B60J 3/0204 296/152 |
| 3,940,180 A * | 2/1976 | Altschul | .................. | B60J 3/02 296/97.7 |
| 4,762,358 A * | 8/1988 | Levosky | .................. | B60J 1/2077 160/323.1 |
| 4,874,938 A | 10/1989 | Chuang | | |
| 5,085,473 A * | 2/1992 | Yang | .................. | B60J 1/2069 160/238 |
| 5,261,717 A * | 11/1993 | Tsumura | .................. | B60J 3/02 296/97.2 |
| 5,265,929 A * | 11/1993 | Pelham | .................. | B60J 3/0208 24/523 |
| 5,538,310 A * | 7/1996 | Frankhouse | .................. | B60J 3/0213 296/214 |
| 6,666,493 B1 | 12/2003 | Naik | | |
| 7,686,372 B2 * | 3/2010 | Suzuki | .................. | B60J 3/02 296/97.4 |
| 9,170,428 B1 * | 10/2015 | Markut | .................. | B60J 3/06 |
| 2012/0285630 A1 | 11/2012 | Berman et al. | | |
| 2015/0367714 A1 * | 12/2015 | Kim | .................. | B60J 3/0204 296/97.2 |

FOREIGN PATENT DOCUMENTS

FR 721397 A * 3/1932
JP 357182521 A * 11/1982

* cited by examiner

*Primary Examiner* — Jason S Morrow

(74) *Attorney, Agent, or Firm* — RG Patent Consulting, LLC; Rachel Gilboy

(57) ABSTRACT

A line of attachable shields, specially designed for use in conjunction with or in lieu of existing automobile sun visors. Design intent to offer consumers improved sun and glare protection from any angle, while enabling them to clearly see the road ahead while driving.

17 Claims, 5 Drawing Sheets

AUTO SUN GLARE ELIMINATOR SYSTEMS

CROSS-REFERENCE TO RELATED APPLICATION

The present application is related to and claims priority from prior provisional application Ser. No. 61/974,445, filed Apr. 3, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of sun-shielding means and more specifically relates to an auto sun glare eliminator for the protection of the driver/passenger eyes from the source of bright light (the sun, glare on other cars and etc.) to be used in cases where the source of bright light interferes with a person's vision.

2. DESCRIPTION OF THE RELATED ART

Everyday millions of consumers climb into their automobiles and head off for a day of work, school, or recreation. Whether a busy executive traveling to an important business luncheon, a homemaker dropping the kids off at a school dance, or a professional delivery man making his rounds, automobiles offer consumers a simple and efficient means of traveling from one destination to the next. Most considerate drivers realize the importance of staying alert behind the wheel and because of this pay close attention to the comings and goings of traffic, their speed, road signs and stop lights. Road safety is desirable.

Unfortunately, as many drivers would attest, there are those obstacles that even the most conscientious of drivers cannot avoid. In particular, driving in the direction of sunlight can be both difficult and dangerous. Causing unavoidable "blind spots," the glare of intense sunlight can make it almost impossible to see the road ahead. Resulting in low contrast vision, glare from the sun can be distracting and can directly affect driving comfort and safety. Burning the eyes and causing fatigue and strain, the blinding glare caused by ultraviolet rays can make even the shortest of journeys exhausting and stressful. Most consumers attempt to solve this problem by utilizing a sun visor.

Conventional sun visors are a standard feature in all cars and trucks and offer the driver a simple means of reducing glare and shading their eyes. Although sun visors are a practical accessory, they do little to combat the glare which enters the vehicle from the side door windows and do a poor job of eliminating glare through the windshield. Specifically, the intense glare from the sun that penetrates the driver or passenger side windows can be just as harmful as that which enters from the windshield. While pulling the sun visor to the side can block this glare, doing so results in light entering the vehicle through the front of the windshield, again, leaving the driver susceptible to the aforementioned dangers.

Conventional visors move in an arc that conflicts with the user's head, causing the user to duck or lean to the side while manipulating the visor from windshield to side window or vice versa. This usually occurs while the user is trying to negotiate a turn since turning causes the angle of the sun to change relative to the vehicle, thereby requiring the visor adjustment. Consequently the user will frequently expose their eyes directly to the sun while performing this maneuver since the visor is essentially non-functional in the intermediate positions. When the sun is at certain angles, for example toward the opposite side of the vehicle from the user, traditional visors are completely useless for screening the sun. In fact, the user will sometimes reach across the vehicle and utilize the visor intended for use by the other passenger to block these angles.

When the sun is low in the sky the traditional visors cannot protect the eyes from the sun without blocking the user's ability for seeing traffic signs on, traffic signals and road situations. When the sun is at the top of the windshield the driver must rotate the solar visors down thereby limiting the field of view. Shorter users have the most trouble using the traditional visors because the visor cannot be sufficiently lowered to effectively screen the sun.

Various attempts have been made to solve the above-mentioned problems such as those found in U.S. Pat. No. 4,874,938 to Cliff Chuang; U.S. Pat. No. 6,666,493 to Sanjeev Manubhai Naik; U.S. Pat. No. 5,445,427 issued to Vandagriff; U.S. Pat. No. 1,791,699 issued to Ayersman; U.S. Pat. No. 6,328,370 issued to Kim; and U.S. Pub. No. 2012/0285630 to Joel Berman. This art is representative of sun-shielding devices. None of the above inventions and patents, taken either singly or in combination, is seen to describe the invention as claimed.

Ideally, a sun glare eliminator system should provide safe, efficient and effective sun glare protection means useful for drivers and, yet would operate reliably and be manufactured at a modest expense. Thus, a need exists for a reliable sun glare eliminator system comprising a protective shield of a reduced size and an adjustable means of attaching to the vehicle permitting the user to easily and safely manipulate the protective shield into any position required to shield the user from the sun to avoid the above-mentioned problems.

BRIEF SUMMARY OF THE INVENTION

In view of the foregoing disadvantages inherent in the known sun-shielding means art, the present invention provides a novel sun glare eliminator system. The general purpose of the present invention, which will be described subsequently in greater detail is to provide an efficient and effective means for preventing glare from distracting vehicle occupants.

A sun glare eliminator system is disclosed herein (in a preferred front-mount embodiment) comprising: at least one sun glare eliminator assembly comprising a left-support-mount-assembly and a right-support-mount-assembly (as a pair) each having a support mount assembly including a horizontal guide, a slider, a bracket, a spool, at least two pulleys, a wire rope, a flexible cable, at least two suction cups, a motor and a sun glare eliminator screen; wherein the sun glare eliminator system is forward-facing during use in a vehicle and comprises the at least one sun glare eliminator assembly. The sun glare eliminator assembly comprises in functional combination the horizontal guide, the slider, the bracket, the spool, the at least two pulleys, the wire rope, the motor, the flexible cable, the at least two suction cups, a motor, and the sun glare eliminator screen.

The horizontal guide is structured and arranged to set up to a windshield via two suction cups (other fastening means may be employed).

The slider comprises a clip locatable on the horizontal guide; the slider able to move horizontally in relation to the horizontal guide; wherein positioning of the slider determines a relative placement of the glare eliminator screen.

The bracket is on the slider and is able to rotate relative its axis to hold the spool in the horizontal position (FIG. 2, 2A) or in alternate embodiments the bracket with the spool is able to rotate in any position (FIG. 3, 3A).

The sun glare eliminator screen may be opaque or in alternate embodiments may be tinted. The sun glare eliminator screen has to be flexible to be able in working or folded.

The spool is mounted on the bracket such that the spool is able to rotate about its axis to dispense and retract a desired amount of the flexible cable to position the sun glare eliminator screen in a user-determined positioning. Relatively speaking, the sun glare eliminator screen is positioned parallel to the spool;

The at least two pulleys and the wire rope are positioned on a back-side of the horizontal guide facing adjacent the windshield; the spool is located on a front-side of the horizontal guide facing the at least one vehicle occupant. The flexible cable comprises thread or cord or other suitable equivalent which may be wound onto or off of the spool. The spool with the flexible cable and/or pulleys with the wire rope may be used to move the sun glare eliminator screen horizontally and/or vertically.

The left-support-mount-assembly is for use by a driver of the vehicle; the right-support-mount-assembly is for use by a passenger of the vehicle; wherein the left-support-mount-assembly and the right-support-mount-assembly are each independently operable of one another.

A kit is disclosed including: the left-support-mount-assembly, the right-support-mount-assembly, and a set of user-instructions for installation and use.

A side sun glare eliminator system is also disclosed herein comprising: a mount-member, at least one telescoping extension/retraction member, and two sun glare eliminator screens (one is opaque, for the day time and one is semi-transparent, for the dark time); wherein the side sun glare eliminator system comprises in functional combination the mount-member, the at least one telescoping extension/retraction member, and the sun glare eliminator screen. In this particular embodiment the mount-member is mountable to an inner surface of a vehicle such as a window pillar or the like.

The at least one telescoping extension/retraction member is connected at a distal end to the mount-member and at a proximate end to the sun glare eliminator screen; wherein the at least one telescoping extension/retraction member is connected between the mount-member and the sun glare eliminator screen; the sun glare eliminator screen able to be telescoped in relation to the mount-member such that the sun glare eliminator screen is able to be appropriately positioned to protect at least one vehicle occupant from side-glare to promote road safety.

In a preferred embodiment of the side sun glare eliminator system the telescoping extension/retraction member comprises a first the telescoping extension/retraction member and a second the telescoping extension/retraction member for telescopic coupling to a first the sun glare eliminator screen, and a second the sun glare eliminator screen, respectively in relation to the mount-member. Both embodiments promote safety in driving and comfort to vehicle occupants.

The present invention holds significant improvements and serves as a sun glare eliminator system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, sun glare eliminator system constructed and operative according to the teachings of the present invention.

The various embodiments of the present invention will hereinafter be described in conjunction with the appended drawings, wherein like designations denote like elements.

DETAILED DESCRIPTION

Figure 1:
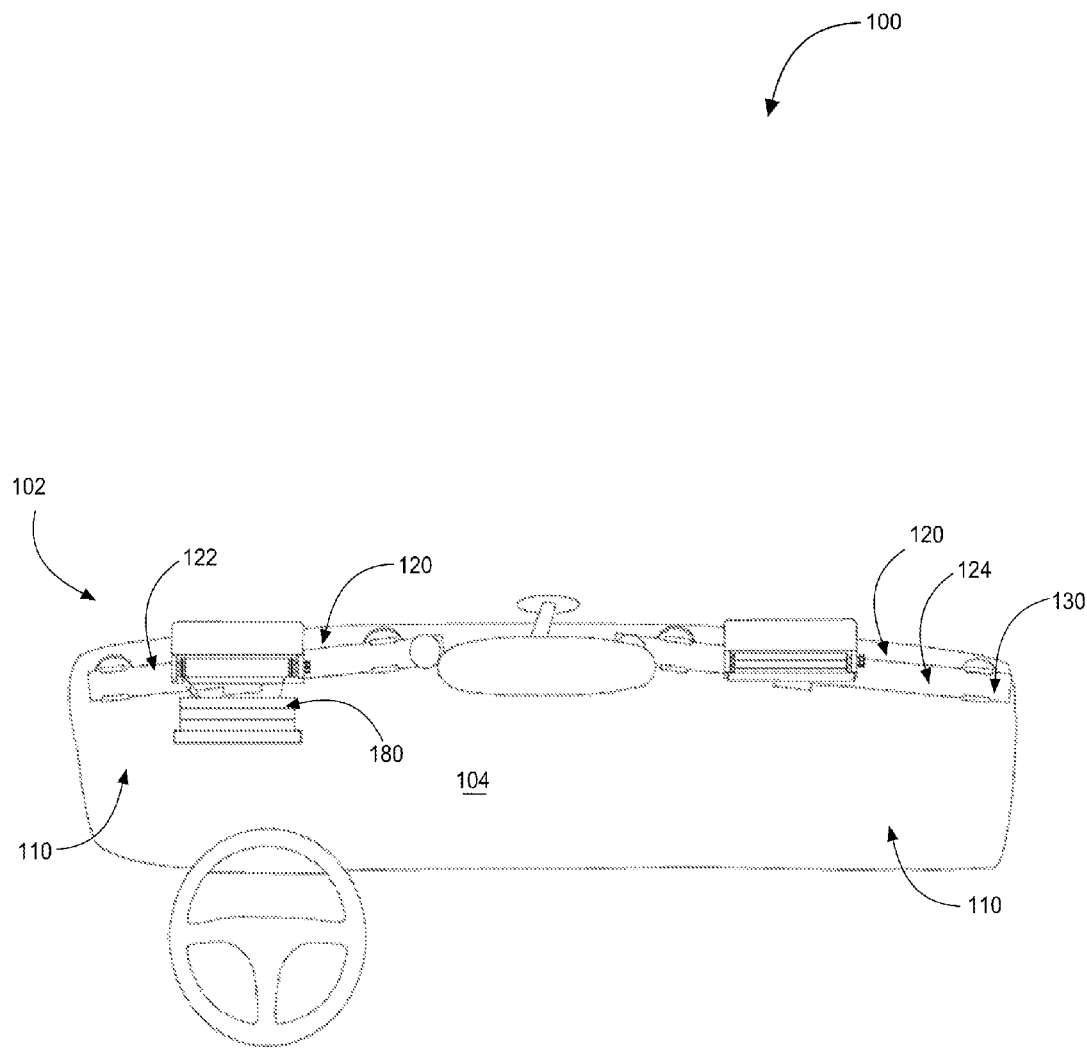
FIG. 1 shows a perspective view illustrating a sun glare eliminator system (a part for the windshield) in an in-use condition according to an embodiment of the present invention.
Figure 2:
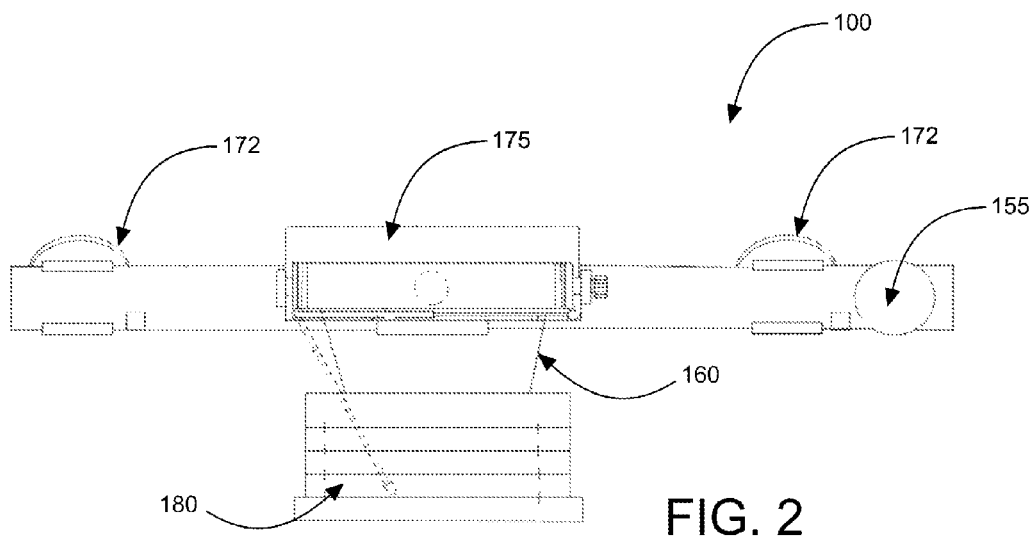
FIG. 2 is a front view illustrating a sun glare eliminator assembly of the sun glare eliminator system according to an embodiment of the present invention of FIG. 1.
Figure 2A:
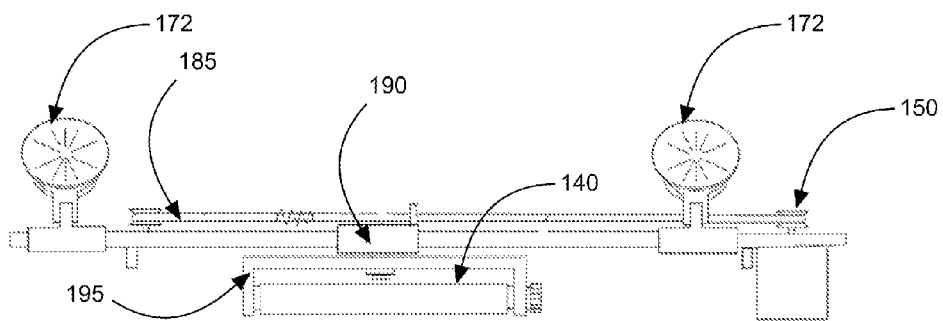
FIG. 2A is a top view illustrating the sun glare eliminator assembly of the sun glare eliminator system according to an embodiment of the present invention of FIG. 1.
Figure 3:
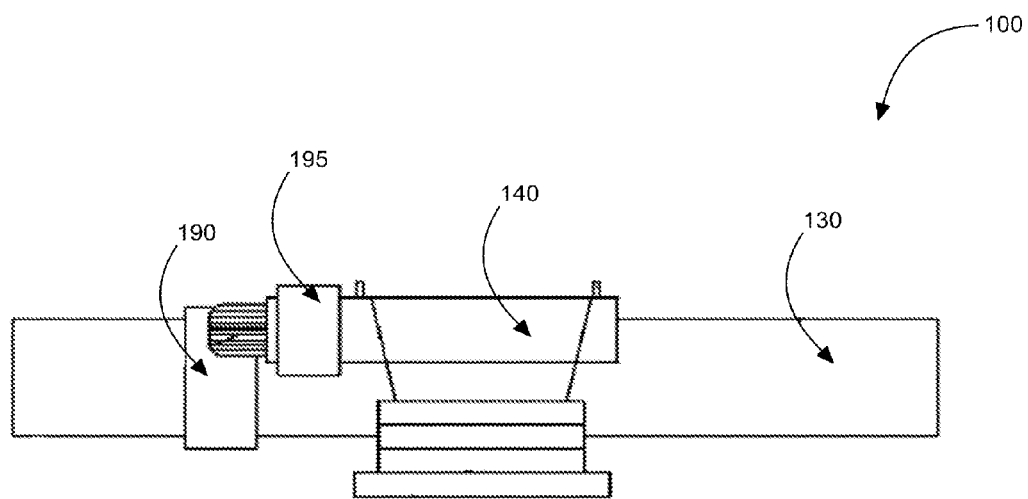
FIG. 3 is a front view illustrating a sun glare eliminator assembly of the sun glare eliminator system in alternate embodiment according to an embodiment of the present invention of FIG. 1.
Figure 3A:
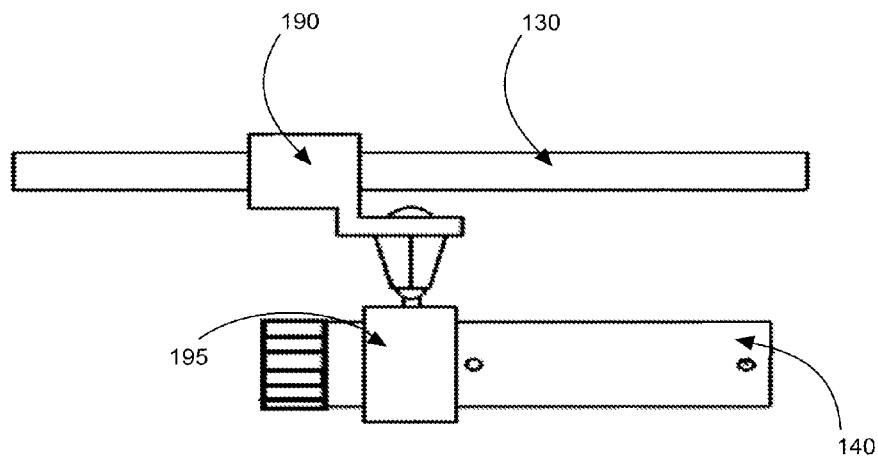
FIG. 3A is a top view illustrating a sun glare eliminator assembly of the sun glare eliminator system according to an embodiment of the present invention of FIG. 1.

As discussed above, embodiments of the present invention relate to a sun-shielding device and more particularly to the sun glare eliminator system as used to improve the comfort of vehicle occupants and promote road safety.

In an embodiment of the present invention the present device is mounted inside of a vehicle. It is comprised of the horizontal guide which is fixed on a windshield (the horizontal guide can be fixed to the windshield, for example, with suction cups or the like). The slider with the bracket is placed on the horizontal guide and can move along the horizontal guide. The bracket is placed on the axis of the slider and can rotate relative the slider. A spool is placed on the bracket in these particular embodiments.

An opaque composite protective shield is fixed at the spool with the threads. Its length can be varied by rotating the spool with the knob. Its lower part has projections that are needed to hold the screen in the folded state. The telescopic axis is set on the bracket. It can rotate relative the bracket. Its function is to extinguish oscillations in the glare eliminator screen while the vehicle is moving. The telescopic axis has a soft nosepiece. It keeps the shield from any fluctuations.

The top screen is mounted on a slider. Its function is to close the clearance between the horizontal guide and the roof of the car. The device may be equipped with a gyroscope and a drive moving the slider and a control unit. The drive moving the slider is preferably placed on the horizontal guide which consists of the motor (step or servo motor), wire rope, pulleys and a spring. The top holders of the slider hold the wire rope for moving the slider together with the wire rope relative to the horizontal guide. The spring holds the wire rope in tension. When the shaft rotates the motor, the wire rope moves the slider in the direction to the sun.

The gyroscope with a horizontal axis of rotation use to determine the vehicle's position relative to the gyroscope axis. It can be placed together with the motor or separately in the vehicle.

The device of this present embodiment works in the following way: the driver or the passenger sets the sun glare eliminator screen in front of his/her eyes blocking the various source of light: the sun, glare on the vehicles located in front of the vehicle, etc. To use the sun glare eliminator screen the driver has to: move the slider with the sun glare eliminator screen relative to the horizontal guide, lower down the sun glare eliminator screen into the necessary position rotating the knob He/she turns on the control unit for automatically adjusting the slider to move towards the light source. The control unit changes the position of the slider relative to the horizontal guide by means of the motor when the light source position relative to the driver/passenger changes or the direction of the vehicle changes. The sun glare eliminator screen is large enough for driver's/passenger's eyes protection but small enough for not reducing the ability of the driver to control traffic situation at any position of the light source relative to the driver.

The control unit moves the slider by means of the motor depending on the changes in the gyroscope's axis direction relative to the vehicle. The control unit has a disk which rotates around the vertical axis simultaneously with rotations of the gyroscope, when there is a change in the direction of the vehicle's movement. Two magnetic tracks may be plotted on the disk. One track is designed to control the right turn of the vehicle; the other is for the left one. Each track has a recording, reading and erasing heads. The recording and reading heads are located next to each other, whereas the erasing heads are located 300° clockwise from the recording head on the track in charge of the right turn of the vehicle and 300° counterclockwise from the recording head on the track in charge of the left turn of the vehicle. The angle may be different for different types of vehicles.

The control module together with the gyroscope operates as follows: Example 1 wherein the sun shines into the windshield. In this case there are no magnetic marks on the disk, and control unit gives a command to a motor to move the slider to the same side and the same distance where the sun moved at the turn of the vehicle. The protective shield will then be located between the driver's eyes and the sun. Example 2 wherein the vehicle makes the right turn. The moment when the sun goes beyond the windshield on the left side, slider reaches the left limit switch. At the same moment a mark appears on the magnetic track for the right turn, the motor is turned off and doesn't react to further right turn of the vehicle. With continuing the right turn, the disk with the mark will rotate counter-clockwise imitating the turn of the gyroscope relatively to the vehicle.

During the vehicle's right turn the magnetic mark on the disc remains up to the angle of 300°. In this interval, the sun goes round the vehicle from its left side to the right and does not get in the driver's way. In case the magnetic mark hasn't got to the erasing head yet, and the vehicle turns back to the left (the sun moves to the left side of windshield), the disc with the mark will turn clockwise and magnetic mark can reach the reading head (in this case the sun enters through the windshield on the left), the motor gets the command to work as in example 1. When the vehicle turns to the right at an angle of more than 300° (the sun appears on the right side of the windshield), the magnetic mark reaches the erasing head and gets erased. At this point, the motor gets a command to move the slider from the left end position to the right, but not coming into contact with the right limit switch. Motor turns on and works as in example 1.

Example 3. The vehicle makes the left turn, the sun goes beyond the windshield. When the vehicle turns to the left the slider reaches right limit switch, which gives the command to create a magnetic mark on the track in charge of the left turn of the vehicle. In this case, everything goes on as in the case with the right turn but in inverse direction. Only in this case, the track in charge of the left turn is used. When the vehicle turns to the left at an angle more than 300° (the sun appears on the left side of the window), the magnetic mark is removed and the motor gets the command to move the slider to the left end position but not coming into contact with the left limit switch. The motor turns on and works as in example 1.

If there are no magnetic marks on the tracks, the control unit gives the motor a command to shift the slider to the distance identical to the rotation of the gyroscope. If a mark is plotted on the track for the left turn, then it is deleted from the track for the right turn and vice versa. If necessary, the driver can move the slider to the needed position by hand from the limit switcher. In this case the disc makes a rapid round to erase the marks with the help of erasing. On turning off the device disc makes one round to erase the marks and turns off only after that.

The gyroscope with the control unit can be used for parallel parking of the vehicle. To perform this function a horizontal guide should have a movable item beeping and a timer. Parallel parking is as follows: the driver turns on the parallel parking function before driving back. The driver turns the steering wheel all the way to enter the parking zone. When the car has the desired rotation angle (e.g., 45 degrees) the slider turns on a sound signal. The driver stops the car and turns the steering wheel to move backward and when the car has the desired rotation angle the slider turns on a timer. The car moves backward at the parking area during previously set time (e.g. within 3 sec.). After this time the signal sounds. The driver turns the steering wheel all the way to put the car in parallel curb. The slider is moved to the initial point and turns on the sound signal. The parallel parking was done.

Generally speaking, auto sun glare eliminator (sun glare eliminator system) may be offered in two versions to accommodate the side windows and the windshield of a vehicle; the auto sun glare eliminator comprises a line of attachment systems designed specifically to block out sun glare and other blinding sources of light, such as from other vehicles.

For the side sections of vehicle, the product may be comprised of a swivel-mounted, ball-and-cup attached clip (mount-member) for use in securing the unit to the existing driver or passenger roof, just above the window or a vehicle pillar. This component may be integrally attached to a tubular column configured as a telescoping antenna, able to extend several inches to facilitate optimal positioning. At the top of the antenna may be the shade itself, a rectangular piece of filtered, shatter-proof plastic. Conversely, the part of the system designed for the windshield may comprise an encased, rolled shading, adhered to the driver and passenger sides via suction cups. Thus designed, the auto sun glare eliminator may be appropriately sized and configured for the various makes and models of cars, vans and trucks on the road.

The auto sun glare eliminator may be packaged and sold as a set in kit form, to be installed by the vehicle owner, or may be included as an upgrade in newly manufactured automobiles. As an additional consideration, these attractive sun visors may be tinted in a variety eye-catching colors to match the vehicle interior, as well as in a host of neutral hues.

When confronted with distracting glare, the user may then pull the attached auto sun glare eliminator to the side, blocking the light from their side window; pulling down the system set at the windshield reduces the glare of light coming in from the front. With both employed at the same time, the motorist is able to block both directions, without having to adjust either as the car, and the sun, changes direction.

The auto sun glare eliminator is a simple-to-use product line that may provide those driving or riding in the front and back seats of automobiles a more comfortable, user-friendly means of viewing the road. Easily attached to any existing vehicle surface or glass, the auto sun glare eliminator system may handily eliminate the blinding glare caused by overhead sunlight from both the windshield and side windows. The auto sun glare eliminator system is designed to ensure that the driver can safely see the road ahead, as well as oncoming traffic approaching from the side, even on the sunniest of afternoons. Blocking the sun's harmful ultraviolet rays, the auto sun glare eliminator may protect the eyes from potentially dangerous overexposure to the sun. Because the auto sun glare eliminator may effectively protect the eyes from glare and sunlight, use of this product may greatly reduce the fatigue associated with both.

Versatile, this product system may be maneuvered to help block rearview and side-view mirror glare at night, distracting reflections from frozen bodies of water and snow during the winter, and even reflective glare from the auto's hood. Easily swiveled and lowered to any position needed while helpfully remaining in place while in use, this present invention may eliminate the need to continuously switch a visor from the front to the side, which can prove annoying as well as distracting.

Referring now to the drawings by numerals of reference there is shown in FIGS. 1-3A, various views of sun glare eliminator system 100 (front-mounted to windshield 104) comprises at least one sun glare eliminator assembly 110 having support mount assembly 120 including horizontal guide 130, spool 140, at least two pulleys 150, flexible cable 160, top screen 175, suction cups 172, motor 155 and sun glare eliminator screen 180; wherein sun glare eliminator system 100 is forward-facing during use in a vehicle 102 (in this particular embodiment) and comprises the at least one sun glare eliminator assembly 110, as shown. As such, support mount assembly 120 of sun glare eliminator assembly 110 comprises in functional combination horizontal guide 130, slider 190, bracket 195, spool 140, the at least two pulleys 150, flexible cable 160, the suction cups 172, wire rope 185, top screen 175, motor 155 and the sun glare eliminator screen 180. horizontal guide 130 is structured and arranged to set up to a windshield 104 (or other suitable surface of interior of vehicle 102 with appropriate fastening means) of vehicle 102 via the suction cups 172.

Spool 140 is mounted to bracket 195 such that spool 140 is able to rotate (clockwise or counter-clockwise about its centerline axis) to dispense and retract a desired amount of flexible cable 160 to position sun glare eliminator screen 180 in a user-determined positioning. Spool 140 may be mounted on bearings or the like or without them.

Sun glare eliminator system 100 may further comprise slider 190, as shown; wherein slider 190 comprise a clip locatable on horizontal guide 130; slider 190 are able to move horizontally in relation to horizontal guide 130. Positioning of slider 190 determines a relative placement of sun glare eliminator screen 180 as manipulated by the driver/occupant of vehicle 102. Sun glare eliminator screen 180 may be positioned and adjusted appropriately depending on sun glare or other light sources such that the driver's/passenger's eyes are not strained. Sun glare eliminator screen 180 is opaque in preferred embodiments. The support-mount-assembly 120 may comprise two suction cups 172. Other fastening means may be used as previously discussed.

Referring now to flexible cable 160; flexible cable 160 may comprise thread, cord or the like. Thread or cord may be sequentially wound and unwound from spool 140.

With reference to relative positioning of the components of sun glare eliminator assembly 110; sun glare eliminator screen 180 is positioned substantially parallel to spool 140; two pulleys 150 positioned on a back-side of horizontal guide 130 facing adjacent windshield 104. Spool 140 is located on a front-side of horizontal guide 130 facing the at least one vehicle occupant.

Support mount assembly 120 comprises left-support-mount-assembly 122 and right-support-mount-assembly 124; wherein left-support-mount-assembly 122 is for use by a driver of vehicle 102; right-support-mount-assembly 124 is for use by a passenger of vehicle 102. Left-support-mount-assembly 122 and right-support-mount-assembly 124 are each independently operable of one another.

Sun glare eliminator system 100 may be sold as a kit comprising the following parts: at least one left-support-mount-assembly 122; at least one right-support-mount-assembly 124; and at least one set of user instructions. The kit has instructions such that functional relationships are detailed in relation to the structure of the invention (such that the invention can be used, maintained, or the like in a preferred manner). Sun glare eliminator system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different mounting combinations, parts may be sold separately, etc., may be sufficient. The kit may further comprise side sun glare eliminator system 400.

Figure 4:
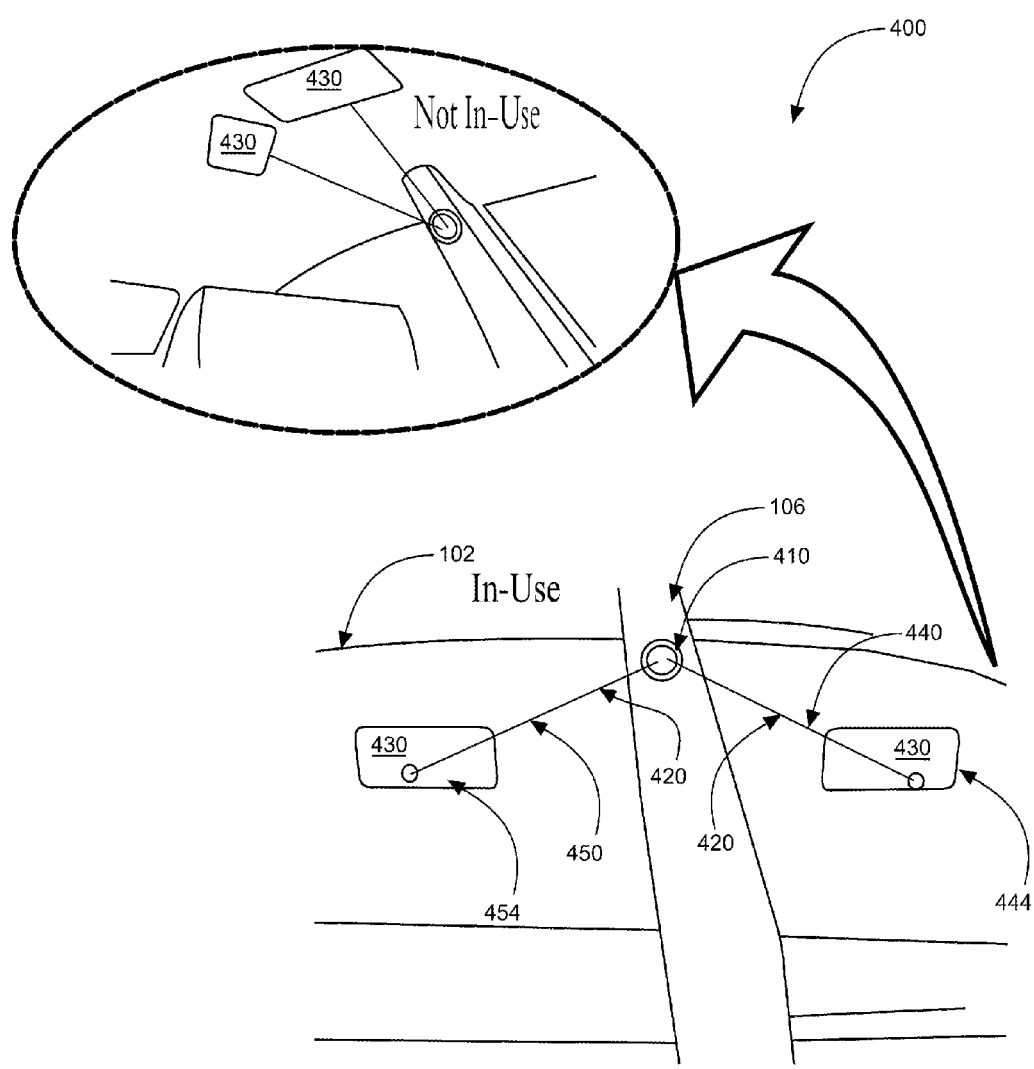
FIG. 4 is a perspective view illustrating a side sun glare eliminator system according to an alternate embodiment of the present invention.
Figure 5:
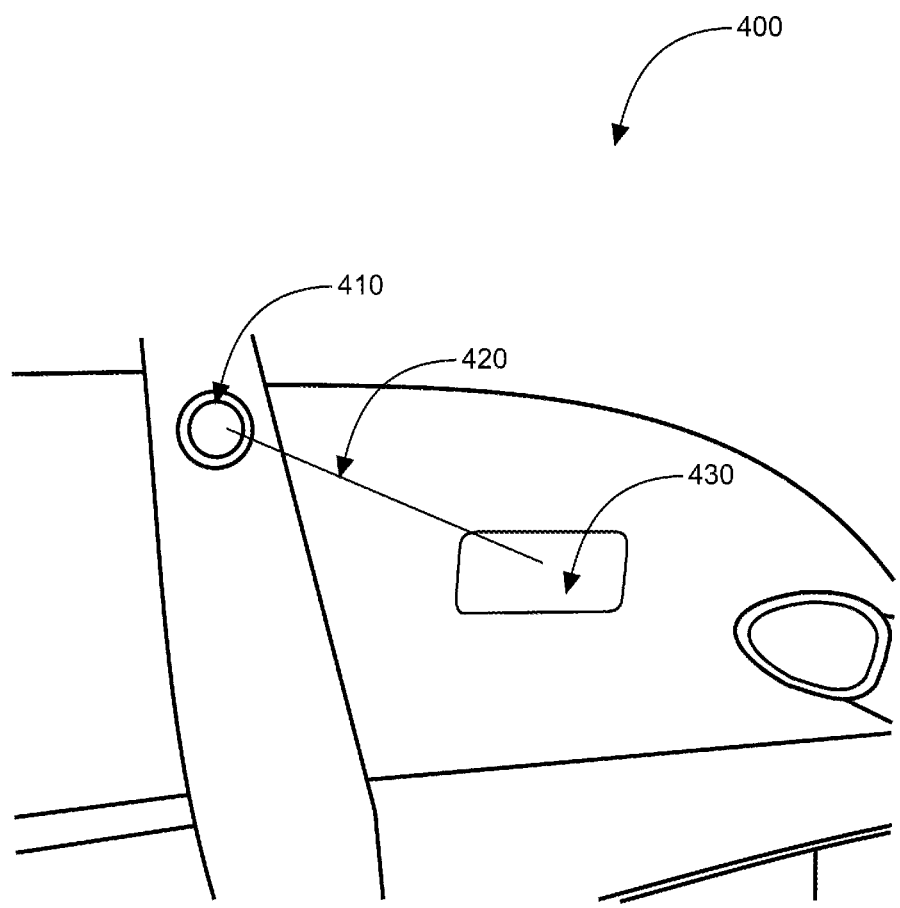
FIG. 5 is another perspective view illustrating the side sun glare eliminator system according to an alternate embodiment of the present invention.

Referring now to FIGS. 4-5, showing various views of side sun glare eliminator system 400 comprising: mount-member 410, at least one telescoping extension/retraction member 420, and sun glare eliminator screen 430; wherein side sun glare eliminator system 400 comprises in functional combination mount-member 410, at least one telescoping extension/retraction member 420, and sun glare eliminator screen 430.

Mount-member 410 is mountable to an inner surface of vehicle 102 such as the roof, a pillar 106 or the like. The at least one telescoping extension/retraction member 420 is connected at a distal end to mount-member 410 and at a proximate end to sun glare eliminator screen 430. As such the at least one telescoping extension/retraction member 420 is connected between mount-member 410 and sun glare eliminator screen 430; sun glare eliminator screen 430 able to be telescoped in relation to mount-member 410 such that sun glare eliminator screen 430 is able to be appropriately positioned to protect at least one vehicle occupant from side-glare to promote road safety. During non-use periods side sun glare eliminator system 400 may be positioned against roof of vehicle 102 or certain embodiments may have retractable telescoping extension/retraction member(s) 420.

The side sun glare eliminator system 400 has 2 sun glare eliminator screens 430. One is opaque for the sunny day and other one is semitransparent for the night time. The semi-transparent screen can be use to protect the eyes from the headlights of the vehicle in the side mirror in the night time.

The at least one telescoping extension/retraction member 420 of side sun glare eliminator system 400 comprises a first telescoping extension/retraction member 440 and a second telescoping extension/retraction member 450 for telescopic coupling to a first sun glare eliminator screen 444, and a second sun glare eliminator screen 454, respectively in relation to mount-member 410.

The side sun glare eliminator 400 can be produced as goods for sale separate from the sun glare eliminator system 100 and can be manufactured in the production car. In the second case, it is possible to mount the standard sunscreen at the rearview mirror. Now the driver can turn the standard sunscreen to the rearview mirror and protect eyes from the sun when the sun is on the right side of the driver.

Steps for using sun glare eliminator system 100 and side sun glare eliminator system 400 may comprise installation, manipulation, and use, followed by non-use as necessary and generally described herein.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:
1. A sun glare eliminator system comprising:
   at least one sun glare eliminator assembly having;
      a support mount assembly including;
         a horizontal guide;
         a slider;
         a bracket;
         a spool;
         at least two pulleys;
         a flexible cable;
         a wire rope; and
         at least one suction cup;
      a gyroscope with a control unit; and
      a sun glare eliminator screen;
   wherein said sun glare eliminator system is forward-facing during use in a vehicle and comprises said at least one sun glare eliminator assembly;
   wherein said sun glare eliminator assembly comprises in functional combination said horizontal guide, said slider, said bracket, said spool, said at least two pulleys, said wire rope, said flexible cable, said at least one suction cup said gyroscope and said control unit, and said sun glare eliminator screen;
   wherein said horizontal guide is structured and arranged to set up to a windshield via said at least one suction cup;
   wherein said slider is mounted on said horizontal guide such that said slider is able to move on said horizontal guide;
   wherein said bracket is mounted on said slider such that said bracket is able to rotate on the axis of said slider and is able to be in horizontal position;
   wherein said gyroscope with a horizontal axis of rotation is used to determine a vehicle's position relative to said gyroscope so as to appropriately position said sun glare eliminator screen;
   wherein said spool is mounted to said bracket such that said spool is able to rotate in relation to said bracket to dispense and retract a desired amount of said flexible cable to position said sun glare eliminator screen in a user determined positioning; and
   wherein said at least two pulleys and said spool work in conjunction with said wire rope to manipulate said slider such that said slider is able to be in position where said sun glare eliminator screen appropriately positioned to protect at least one vehicle occupant from glare to promote road safety.
2. The sun glare eliminator system of claim 1 wherein said the slider comprises a clip locatable on said horizontal guide, said the slider able to move in relation to said horizontal guide.

3. The sun glare eliminator system of claim 2 wherein positioning of said the slider determines a relative placement of said sun glare eliminator screen.

4. The sun glare eliminator system of claim 3 wherein said sun glare eliminator screen is opaque.

5. The sun glare eliminator system of claim 3 wherein said glare eliminator screen is flexible.

6. The sun glare eliminator system of claim 1 wherein said support mount assembly comprises two suction cups.

7. The sun glare eliminator system of claim 1 wherein said flexible cable comprises thread.

8. The sun glare eliminator system of claim 1 wherein said flexible cable comprises cord.

9. The sun glare eliminator system of claim 1 wherein said spool is for controlling said flexible cable.

10. The sun glare eliminator system of claim 1 wherein said sun glare eliminator screen is positioned parallel to said spool.

11. The sun glare eliminator system of claim 1 wherein said at least two pulleys are positioned on a back-side of said horizontal guide facing adjacent said windshield.

12. The sun glare eliminator system of claim 9 wherein said spool is located parallel to the horizon on a front-side of said horizontal guide facing said at least one vehicle occupant.

13. The sun glare eliminator system of claim 1 wherein said at least one sun glare eliminator assembly comprises a left sun glare eliminator assembly and a right sun glare eliminator assembly.

14. The sun glare eliminator system of claim 13 wherein said left sun glare eliminator assembly is for use by a driver of said vehicle.

15. The sun glare eliminator system of claim 13 wherein said right sun glare eliminator assembly is for use by a passenger of said vehicle.

16. The sun glare eliminator system of claim 13 wherein said left sun glare eliminator assembly and a right sun glare eliminator assembly are each independently operable of one another.

17. The sun glare eliminator system of claim 13 further comprising a kit including:

said left sun glare eliminator assembly;

said right sun glare eliminator assembly;

and a set of user-instructions.

* * * * *